(12) United States Patent
Do (10) Patent No.: US 7,894,141 B2
(45) Date of Patent: Feb. 22, 2011

(54) IMAGING LENS (75) Inventor: Satoshi Do, Saitama (JP)

(73) Assignees: Milestone Co., Ltd., Tokyo (JP); Satoshi Do, Saitama (JP)

( * ) Notice: Subject to any disclaimer, the term of this patent is extended or adjusted under 35 U.S.C. 154(b) by 0 days.

(21) Appl. No.: 11/991,463

(22) PCT Filed: Jul. 3, 2007

(86) PCT No.: PCT/JP2007/063280

§ 371 (c)(1),
(2), (4) Date: Mar. 5, 2008

(87) PCT Pub. No.: WO2008/129687

PCT Pub. Date: Oct. 30, 2008

(65) Prior Publication Data

US 2010/0220401 A1   Sep. 2, 2010

(30) Foreign Application Priority Data

Apr. 5, 2007   (JP)   ............... 2007-099316

(51) Int. Cl.
*G02B 3/02*   (2006.01)
*G02B 9/12*   (2006.01)

(52) U.S. Cl. .................. 359/716; 359/784; 359/791

(58) Field of Classification Search ................ 359/708, 359/716, 784, 791
See application file for complete search history.

(56) References Cited

U.S. PATENT DOCUMENTS

| 5,940,219 | A  | 8/1999  | Yamada |
| 6,028,713 | A  | 2/2000  | Ohno |
| 6,466,377 | B1 | 10/2002 | Saito et al. |
| 6,724,547 | B2 | 4/2004  | Sato |
| 6,795,253 | B2 | 9/2004  | Shinohara |
| 6,930,841 | B2 | 8/2005  | Sato |
| 6,961,191 | B2 | 11/2005 | Sato |

(Continued)

FOREIGN PATENT DOCUMENTS

JP   2002-221659   8/2002

(Continued)

OTHER PUBLICATIONS

European Search Report for Application No. EP 07 76 8054, Dated: May 29, 2009.

*Primary Examiner*—Jack Dinh
(74) *Attorney, Agent, or Firm*—Venable LLP; Jeffri A. Kaminski; Christopher Ma (57) ABSTRACT

An imaging lens of which various aberrations are corrected well, optical length is short, and back focus is sufficiently secured, is provided. The imaging lens is formed of a first lens $L_1$, an aperture stop S, a second lens $L_2$ and a third lens $L_3$, arranged in this sequence from the object side to the image side. The first lens $L_1$ is a meniscus lens having a positive refractive power, of which convex surface faces the object side, the second lens $L_2$ is a meniscus lens having a positive or negative refractive power, of which convex surface faces the image side, and the third lens $L_3$ is a meniscus lens having a negative refractive power, of which convex surface faces the object side. The Abbe number ν of the second lens $L_2$ is a value in a 50.0 to 60.0 range.

3 Claims, 7 Drawing Sheets

U.S. PATENT DOCUMENTS

| | | |
|---|---|---|
| 6,980,372 B1 | 12/2005 | Do |
| 6,985,307 B2 | 1/2006 | Do |
| 6,989,947 B2 | 1/2006 | Do |
| 7,196,856 B2 | 3/2007 | Nakamura |
| 7,251,083 B2 | 7/2007 | Kubota et al. |
| 7,511,899 B2 | 3/2009 | Isono |
| 2003/0210475 A1 | 11/2003 | Shinohara |
| 2005/0007481 A1 | 1/2005 | Yamaguchi et al. |
| 2005/0030645 A1 | 2/2005 | Do |
| 2005/0270665 A1 | 12/2005 | Do |
| 2006/0066748 A1 | 3/2006 | Isono |
| 2006/0092310 A1 | 5/2006 | Sato et al. |
| 2007/0195432 A1 | 8/2007 | Nakamura |
| 2007/0223111 A1 | 9/2007 | Do |

FOREIGN PATENT DOCUMENTS

| | | |
|---|---|---|
| JP | 2002-244030 | 8/2002 |
| JP | 2003-149545 | 5/2003 |
| JP | 2004-004566 | 1/2004 |
| JP | 2004219982 | 8/2004 |
| JP | 2004-302060 | 10/2004 |
| JP | 2005-55751 | 3/2005 |
| JP | 2005-173319 | 6/2005 |
| JP | 2005-227755 | 8/2005 |
| JP | 2005345713 | 12/2005 |
| JP | 2006098429 | 4/2006 |
| JP | 2006154767 | 6/2006 |

IMAGING LENS

TECHNICAL FIELD

The present invention relates to an imaging lens, and more particularly to an imaging lens that can be suitably used for an imaging device using a solid-state image sensor, such as a CCD image sensor (Charged Coupled Device Image Sensor) or a CMOS image sensor (Complementary Metal Oxide Semiconductor Image Sensor), which is mounted on a portable telephone or the like.

BACKGROUND ART

The optical length must be short in the above mentioned imaging lens. In other words, to construct an imaging lens, the ratio of the optical length to a focal length of the imaging lens must be minimized. The optical length here refers to a length defined as a distance from the entrance surface of the imaging lens at the object side to the image formation surface (light receiving surface of the solid-state image sensor). Hereafter an imaging lens of which ratio of the optical length to the focal length is small may be referred to as a "compact imaging lens", and implementing a compact imaging lens may be referred to as "compacting the imaging lens". In the case of a portable telephone, for example, at least this optical length must be smaller than the thickness of the portable telephone main unit.

Back focus, which is defined as a distance from the outgoing surface to the image sensing surface, on the other hand, is preferably at the maximum. In other words, when an imaging lens is designed, the ratio of the back focus to the focal length must be maximized. This is because of the need to insert a filter, cover glass, and other components between the pickup lens and the pickup surface.

In addition to this, it is naturally demanded for an imaging lens that various aberrations are corrected to be small enough that the distortion of an image is not visually recognized, and the integration density of the elements in minimum units for detecting light (also called "pixels"), which are arranged in a matrix on the light receiving surface of the CCD image sensor, for example, is sufficiently satisfied. In other words, various aberrations must be well corrected. Hereafter an image when various aberrations are well corrected may be referred to as a "good image".

As listed below, three lens-configuration imaging lenses, which use such a solid-state image sensor as a CCD image sensor or a CMOS image sensor, and are suitable for an imaging device of a portable telephone, have been disclosed.

Of these imaging lenses, the following first to sixth imaging lenses have been disclosed as a three lens-configuration lens belonging to a first category (see Patent Documents 1 to 6).

The first imaging lens is comprised of an aperture stop, a first lens, a second lens and a third lens arranged in this sequence from the object side. The first lens is a meniscus lens having a positive refractive power, of which convex surface is facing the image surface side near the optical axis. The second lens is a meniscus lens having a negative refractive power, of which convex surface is facing the object side near the optical axis, and at least the first surface of the second lens is formed in an aspherical shape. The third lens is a lens having a positive refractive power, of which convex surface is formed at the image surface side near the optical axis. In the first imaging lens, the second surface at the image surface side of the first lens is a convex surface, and the first surface of the first lens is a concave surface or plane surface, and because of this, the first imaging lens has a wide angle of view. The first imaging lens can correct the aberration well, and can be manufactured easily (see Patent Document 1).

The second imaging lens is a single focus lens which has a simple configuration of an aperture stop and three lenses, and is comprised of a first lens having a positive refractive power of which at least one surface is aspherical, a second lens having a negative refractive power, and a third lens having a positive refractive power of which at least one surface is aspherical, arranged in this sequence from the object side. The second imaging lens has a configuration where the refractive power is distributed into positive, negative and positive sequentially from the object side, and the aperture stop is between the first lens $L_1$ and the second lens $L_2$, which is a configuration appropriate for acquiring good optical performance as a three lens-configuration imaging lens. Also by this configuration, a distance from the exit pupil to the image formation position can be long. This means that the angle formed by a principal ray of each beam, emitted from the final surface of the lens system, and the optical axis, can be small, that is, the telecentric performance can be better, color irregularity can be prevented, and good optical performance can be acquired (see Patent Document 2).

The third imaging lens is comprised of a first lens having a positive refractive power, of which a concave surface is formed at the object side near the optical axis, an aperture stop, a second lens having a negative refractive power, and a third lens having a positive refractive power, arranged in this sequence from the object side. The ratio of a focal length $f_1$ of the first lens to a focal length $f_3$ of the third lens $(f_1/f_3)$ is set to be 1.2 or less and 0.8 or more. Because of this configuration, a wide angle of view can be secured while maintaining a desired optical performance even if the image sensor becomes small. This imaging lens can correct each aberration well, and make the focal length shorter. And this imaging lens can also downsize the entire optical system, and can easily be manufactured (see Patent Document 3).

The fourth lens is comprised of a first lens, a second lens and a third lens, arranged in this sequence from the object side. The first lens is a meniscus lens formed of plastic with at least one aspherical surface, having a weak refractive power, of which convex surface is facing the object side. The second lens is a meniscus lens formed of plastic with at least one aspherical surface, having a weak refractive power, of which concave surface is facing the object side. The third lens is a lens formed of glass having a positive refractive power. The first lens and the second lens are plastic lenses, but the refractive powers thereof are weakened so that most of the refractive power is distributed to the third lens, therefore even if this fourth imaging lens is a compact three lens configuration, the shift of focus due to a change in temperature can be suppressed.

The convex surface of the first lens faces the object side in the fourth imaging lens. This is for preventing an increase of the negative distortion aberration. The concave surface of the first lens and the concave surface of the second lens face each other so as to decrease the generation of spherical distortion and comatic aberration. The third lens plays a role of achieving an optimum focal length by converging the beams, and correcting the image surface, which became "over" by the first and second lens, to be "under". Because of this configuration, an image formation lens with good image forming performance can be downsized at lower cost, and can easily suppress a focus shift due to a temperature change, can be implemented using plastic lenses (see Patent Document 4).

The fifth imaging lens is comprised of a first lens, an aperture stop, a second lens and a third lens, arranged in this sequence from the object side. The first lens is a lens having a positive refractive power, of which the object side surface is a convex surface. The second lens is a meniscus lens formed of plastic material of which at least one surface is aspherical, and which has a positive or negative refractive power, and of which concave surface is facing the object side near the optical axis. The third lens is a meniscus lens having a positive refractive power of which both surfaces are aspherical, and convex surface faces the object side. Because of this configuration, high optical performance can be acquired while decreasing cost, and application is possible not only to module cameras for portable telephones, but also to digital cameras (see Patent Document 5).

The sixth imaging lens is comprised of a first lens which is biconvex, a second lens, which is a meniscus lens of which concave surface is facing the object side, and a third lens, which is a meniscus lens of which convex surface is facing the object side. Since the second lens and the third lens are meniscus lenses, and the concave surface of the second lens faces the object side and the convex surface of the third lens faces the object side, each aberration can be corrected well, the overall length of the lens system can be decreased, and high resolution can be implemented (see Patent Document 6). The embodiment disclosed in Patent Document 6 shows that the third lens has a positive refractive power. In other words, the third lens is a meniscus lens of which convex surface is facing the object side, where the radius of curvature at the object side is set to be shorter than the radius of curvature at the image side.

As mentioned above, the imaging lenses belonging to the first category represented by the first to sixth imaging lenses commonly comprise the third lens having a positive refractive power. Therefore in the case of the imaging lenses belonging to the first category, increasing the ratio of the back focus to optical length is difficult. In other words, in the case of imaging lenses belonging to the first category, if sufficient length is secured for back focus, the optical length becomes long, and compacting imaging lenses is difficult.

As a three lens-configuration imaging lens belonging to the second category, the following seventh imaging lens has been disclosed (see Patent Document 7).

The seventh imaging lens is a front shutter type single focus lens comprised of an aperture stop, a first lens, a second lens and a third lens arranged in this sequence from the object side. The first lens is a lens of which at least one surface is aspherical, and object side is a concave surface, and which has a negative refractive power. The second lens is a lens having a positive refractive power. The third lens is a lens of which at least one surface is aspherical, and object side is a concave surface, and which has a negative refractive power. Because of this configuration, a front shutter type single focus lens, which can be made compact while correcting aberrations well, can be implemented using a three lens-configuration in an imaging lens for a compact size image sensor for a digital camera, for example (see Patent Document 7).

However the seventh imaging lens is a lens of which the first lens disposed at the object side has a negative refractive power, so sufficient compacting is difficult.

As three lens-configuration imaging lenses belonging to a third category, the following eighth to tenth imaging lenses have been disclosed (see Patent Documents 8 to 10).

The eighth imaging lens is comprised of a first lens, which is a meniscus lens having a positive refractive power, of which convex surface is facing the object side, a second lens, which is a meniscus lens having a negative refractive power, and a third lens having a positive refractive power, arranged in this sequence from the object side. The Abbe number of the second lens is set to less than 50. Because of this configuration, shading can be prevented by setting the maximum exit angle to the element surface of the light receiving element to be smaller than the angle of view, and aberrations can be corrected so as to support a solid-state image sensor which is comprised of high density pixels at the mega bit order, and a imaging lens which is further compact and light weight can be implemented (see Patent Document 8).

The ninth imaging lens is comprised of a first lens having a positive refractive power, of which convex surface is facing the object side, a second lens, which is a meniscus lens having a negative refractive power, of which convex surface is facing the image side, and a third lens having a positive refractive power, of which convex surface is facing the object side, arranged in this sequence from the object side to the image side. The Abbe number of the second lens is set to a 20 to 40 range. Because of this configuration, an imaging lens where compactness and light weight are implemented while correcting such aberrations as chromatic aberration, distortion aberration and curvature of image surface well, back focus is appropriately secured, and telecentric performance can be maintained by decreasing the incident angle of principal rays to the sensor surface of the image sensor, can be implemented (see Patent Document 9).

The tenth imaging lens is comprised of a first lens having mainly a positive refractive power, of which convex surface is facing the object side, a second lens, which is a meniscus lens of which concave surface is facing the object side, and a third lens which functions as a corrective lens, arranged in this sequence from the object side to the image surface side. Because of this configuration, the overall length of the lenses can be effectively decreases while correcting various aberrations well, and an imaging lens where compactness and light weight are possible, while maintaining a high optical performance, is implemented.

By setting the Abbe number of the first lens to a value in a 40 to 72 range, the Abbe number of the second lens to a value in a 20 to 40 range, and an Abbe number of the third lens to a value in a 40 to 72 range, the chromatic aberration on the axis can be corrected well (see Patent Document 10).

However imaging lens belonging to the third category commonly comprises a third lens having a positive refractive power. Therefore in the case of imaging lenses belonging to the third category, increasing the ratio of the back focus to the optical length is difficult.

Also imaging lenses belonging to the third category commonly comprises a first lens having a positive refractive power, so the second lens is set to have a negative refractive power in order to correct aberrations.

Also the Abbe number of the second lens is set to a value less than 50. This makes the range of the selection of parameters (e.g. radius of curvature of lens surface) for defining the shape of the second lens become narrow. If the range of the selection of parameters for defining the shape of the second lens becomes narrow, compactness is limited accordingly.

As three lens-configuration imaging lenses belonging to the fourth category, the following eleventh to fifteenth imaging lenses have been disclosed (see Patent Documents 11 to 15).

The eleventh imaging lens is comprised of a first lens, an aperture stop, a second lens and a third lens arranged in this sequence from the object side. The first lens is a meniscus lens having a positive refractive power, of which convex surface is facing the object side. The second lens is a meniscus lens having a positive refractive power, of which concave surface is facing the image side and of which shape is such that both surfaces are aspherical, the negative refractive force gradually decreases as the edge section has a positive refractive power. Because of this configuration, an imaging lens, of which overall length is short with a small number of lenses, which has good optical performance that can be applied to the latest image sensors even though the lens system is compact, and which can decrease the incident angle to the image sensor, is implemented (see Patent Document 11).

The twelfth imaging lens is comprised of an aperture stop, a first lens which is a biconvex lens having a positive refractive power, a second lens having a negative refractive power, of which concave surface is facing the object side, and a third lens, which is a meniscus lens of which convex surface is facing the object side, arranged in this sequence from the object side. Because of this configuration, an imaging lens, which is smaller than a conventional type but in which various aberrations are corrected well, can be implemented (see Patent Documented 12).

The thirteenth imaging lens is comprised of a first lens, aperture stop, a second lens and a third lens. The first lens is a lens having a positive refractive power, of which at least one surface is aspherical, and a having a shape near the optical axis that is biconvex. The second lens is meniscus lens having a positive refractive power, of which at least one surface is aspherical, and concave surface is facing the object side near the optical axis. The third lens is a lens having a positive or negative refractive power formed of plastic material, of which both surfaces are aspherical and surface at the object side is a convex shape near the optical axis. Because of this configuration, a high performance and compact imaging lens is implemented by using aspherical surfaces effectively, with a smaller number of lenses while decreasing cost (see Patent Document 13).

The fourteenth imaging lens is comprised of the first lens, a aperture stop, a second lens, and a third lens arranged from the object side. The first lens is a lens having a positive refractive power, of which convex surface is facing the object side. The second lens is a meniscus lens having a positive refractive power, of which convex side is facing the image side. The third lens is a lens having a negative refractive power, of which concave surface is facing the image side. Because of this configuration, an image lens, which is smaller than a conventional type but in which various aberrations are corrected well, can be implemented (see Patent Documented 14).

The fifteenth imaging lens is comprised of an aperture stop, a first lens having a positive refractive power, a second lens having a negative refractive power, and a third lens having a positive or negative refractive power, arranged in this sequence from the object side. Because of this configuration, an imaging lens, which has good image formation performance, distortion aberration characteristic, sufficient peripheral light quantity and appropriate back focus, and which is also compact, can be implemented (see Patent Document 15).

However in the case of the eleventh to fifteenth imaging lenses belonging to the fourth category, the radius of curvature $r_1$, near the optical axis on the object side face, of the first lens disposed at the object side out of the three composing lenses, is too large compared with the focal length (composite focal length determined by three lenses: first lens, second lens and third lens) f of the imaging lens, and it is difficult to design the imaging lens to be compact. In other words, the imaging lens belonging to the fourth category, the value $r_1/f$ is too large, therefore compacting the imaging lens is difficult. Compacting here quantitatively refers to decreasing the ratio of the focal length f of the imaging lens to the optical length D, that is D/f.

As a three lens-configuration imaging lens belonging to the fifth category, the following sixteenth imaging lens has been disclosed (see Patent Document 16).

The sixteenth imaging lens is comprised of a first lens, an aperture stop, a second lens and a third lens, arranged in this sequence from the object side. The first lens is a lens formed of a glass material, having a positive refractive power, of which the surface of the object side is a convex shape. The second lens is a meniscus lens having a positive refractive power formed of a plastic material, of which at least one surface is aspherical and concave surface is facing the object side. The third lens is a meniscus lens formed of a plastic material having a positive or negative refractive power, or which both surfaces are aspherical and convex surface is facing the object side. Because of this configuration, a high performance and compact imaging lens can be implemented while decreasing the cost (see Patent Document 16).

However the value of the focal length $f_1$ of the first lens of the sixteenth imaging lens is too large with respect to the focal length f of the imaging lens (value $f_1/f$ is too large), so compacting this imaging lens is difficult.

As a three lens-configuration imaging lens belonging to the sixth category, the following seventeenth imaging lens has been disclosed (see Patent Document 17).

The seventeenth imaging lens is comprised of a first lens having a positive refractive power, of which concave surface is formed at the object side near the optical axis, an aperture stop, a second lens having a negative refractive power, and a third lens having a positive refractive power, and arranged in this sequence from the object side. The absolute value of the radius of the center curvature $R_1$ of the first surface of the first lens at the object side is set to a focal length f of the entire optical system or more, and the focal length $f_2$ of the second lens is set to 0.6 times the focal length f of the entire system or less. By specifying the radius of the center curvature $R_1$ of the first surface of the first lens, each aberration, particularly the image surface curvature, can be effectively corrected. And even if the image sensor is small, the angle of view can be increased and the focal length can be decreased while maintaining a desired optical performance, and the entire optical system can be downsized and easily manufactured (see Patent Document 17).

However in the case of the seventeenth imaging lens, the first lens is a lens having a positive refractive power, of which concave surface is formed at the object side, and is set to be $|R_1| \geq f_1$, so the back focus can be increased but decreasing the optical length D (decreasing the value D/f) is difficult. Therefore compacting the seventeenth imaging lens is difficult. Also the second lens has a negative refractive power and the Abbe number is set to be less than 50, so flexibility in design to decrease chromatic aberration is small, which makes it difficult to make the lens compact.

As a three lens-configuration imaging lens belonging to the seventh category, the following eighteenth imaging lens has been disclosed (see Patent Document 18).

The eighteenth imaging lens is comprised of a front group, where the first and second lens are disposed and which has a positive refractive power as an entire group, an aperture stop, and a rear group, where a third lens having a negative refractive power is disposed, arranged in this sequence from the object side. The first lens is a biconcave lens having a negative refractive power, of which concave surface is facing the object side. The second lens is a biconvex lens, of which surface having a strong curvature is facing the object side. The third lens is a meniscus lens having a negative refractive power, of which concave surface is facing the object side. Because of this configuration, an inexpensive and high performance compact lens, of which overall length of the lens (optical length) is short, can be implemented for the camera lens (see Patent Document 18).

However in the case of the eighteenth imaging lens, of which first lens has a negative refractive power, the value of a spherical aberration when the F number is 6.7 is about −1 mm, but the image surface curvature is large, about 1 mm, of which + or − is opposite that of the value of the spherical aberration. Because of these aberrations, the eighteenth imaging lens can be used for a conventional imaging using silver film, but cannot be mounted for a portable telephone which uses a CCD image sensor or a CMOS image sensor as an image sensor.

As a three lens-configuration imaging lens belonging to the eighth category, the following nineteenth imaging lens has been disclosed (see Patent Document 19).

The nineteenth imaging lens is comprised of a first lens having a positive refractive power of which convex surface is facing the object side, an aperture stop, a second lens which is a meniscus lens having a positive refractive power, of which convex surface is facing the image side, and a third lens having a negative refractive power of which concave surface is facing the image side. By adjusting parameters, such as the radius of curvature of the composing lens surface and space between composing lenses, using this configuration, a three lens-configuration imaging lens, which is smaller than a conventional type but where various aberrations are corrected well, can be implemented, and it becomes possible to provide imaging units and portable terminals where this imaging lens is mounted (see Patent Document 19).

However in the case of the nineteenth imaging lens, the ratio of the focal length $f_3$ of the third lens to the focal length f of the imaging lens, that is ($f_3/f$), is set to a value in a −2.0 to −0.4 range, and the negative refractive power of the third lens is strong (focal length is short). Therefore it is difficult to implement an imaging lens to provide good images where the open F value is smaller and various aberrations are sufficiently removed. According to the embodiment disclosed in Patent Document 19, the smallest open F value of the imaging lens is still 3.60.

As described above, in all the imaging lenses belonging to the first to eighth categories, lenses which satisfy the single condition that the optical length with respect to the focal length f of the imaging lens is short, or the back focus is at the maximum, are disclosed, but imaging lenses having sufficient brightness that simultaneously satisfies the following three conditions that the optical length is short, the back focus is at the maximum, and good images can be acquired, are not disclosed.

Even if the first to nineteenth imaging lenses are combined, it is difficult to implement an imaging lens having sufficient brightness, which can simultaneously satisfy the three conditions that the optical length is short, the back focus is at the maximum, and good images can be acquired.

Patent Document 1: Japanese Patent Application Laid-Open No. 2001-075006
Patent Document 2: Japanese Patent Application Laid-Open No. 2003-149548
Patent Document 3: Japanese Patent Application Laid-Open No. 2002-221659
Patent Document 4: Japanese Patent Application Laid-Open No. H10-301022
Patent Document 5: Japanese Patent Application Laid-Open No. 2004-302058
Patent Document 6: Japanese Patent Application Laid-Open No. 2005-173319
Patent Document 7: Japanese Patent Application Laid-Open No. 2003-149545
Patent Document 8: Japanese Patent Application Laid-Open No. 2004-219982
Patent Document 9: Japanese Patent Application Laid-Open No. 2004-219982
Patent Document 10: Japanese Patent Application Laid-Open No. 2005-309210
Patent Document 11: Japanese Patent Application Laid-Open No. 2003-322792
Patent Document 12: Japanese Patent Application Laid-Open No. 2004-004566
Patent Document 13: Japanese Patent Application Laid-Open No. 2004-302060
Patent Document 14: Japanese Patent Application Laid-Open No. 2005-242286
Patent Document 15: Japanese Patent Application Laid-Open No. 2005-227755
Patent Document 16: Japanese Patent Application Laid-Open No. 2004-302059
Patent Document 17: Japanese Patent Application Laid-Open No. 2002-244030
Patent Document 18: Japanese Patent Application Laid-Open No. H10-301021
Patent Document 19: Japanese Patent Application Laid-Open No. 2006-154767

DISCLOSURE OF THE INVENTION

Problems to be Solved by the Invention

With the foregoing in view, it is an object of the present invention to provide an imaging lens having sufficient brightness, of which optical length is short, back focus is at the maximum, and good images can be acquired. Here "optical length is short" means that the ratio of the optical length to the focal length is small. "Back focus is at the maximum" means that the ratio of the back focus to the focal length is at the maximum. It is another object of the present invention to provide an imaging lens which has low cost and is light weight.

Means for Solving the Problems

To achieve the above object, an imaging lens according to the present invention is comprised of a first lens $L_1$, an aperture stop S, a second lens $L_2$ and a third lens $L_3$, arranged in a sequence of the first lens $L_1$, the aperture stop S, the second lens $L_2$ and the third lens $L_3$ from an object side to an image side. The first lens $L_1$ is a meniscus lens having a positive refractive power, of which convex surface faces the object side. The second lens $L_2$ is a meniscus lens having a positive or negative refractive power, of which convex surface faces the image side. The third lens $L_3$ is a meniscus lens having a negative refractive power, of which convex surface is facing the object side.

Both surfaces of the first lens $L_1$, both surfaces of the second lens $L_2$, and both surfaces of the third lens $L_3$ are aspherical, and satisfy the following conditions.

$$0.90 < D/f < 1.20 \tag{1}$$

$$0.20 < r_1/f < 0.35 \tag{2}$$

$$0.80 < f_1/f < 1.00 \tag{3}$$

$$-9.00 < f_3/f < -3.20 \tag{4}$$

$$50.0 < \nu < 60.0 \tag{5}$$

where, f: composite focal length (focal length of the imaging lens) generated by the three lenses of the first lens $L_1$, the second lens $L_2$ and the third lens $L_3$;

D: distance from the object side face of the first lens $L_1$ to the image face (in the atmosphere);

$r_1$: radius of curvature of the object side face of the first lens $L_1$ in the vicinity of the optical axis (radius of curvature at the optical axis);

$f_1$: focal length of the first lens $L_1$;

$f_3$: focal length of the third lens $L_3$;

ν: Abbe number of the second lens $L_2$.

Here the distance given by D is equal to the optical length.

In order to achieve the object of providing an imaging lens which has low cost and is light weight, it is preferable that the first lens $L_1$, second lens $L_2$ and third lens $L_3$, constituting the imaging lens of this invention, are all formed of plastic material. Here a plastic material means a polymer material which can form a lens by plastic deformation, and molding using heat and/or pressure, and is a material which is transparent to visible light.

Specifically it is preferable that the first lens $L_1$, second lens $L_2$ and third lens $L_3$ are lenses of which material is a cycloolefin plastic.

It is also preferable that the first lens $L_1$ and second lens $L_2$ are lenses of which material is a cycloolefin plastic, and the third lens $L_3$ is a lens of which material is a polycarbonate.

EFFECT OF THE INVENTION

An object, of the present invention is to provide an imaging lens of which optical length is short, and back focus is at the maximum, and whereby good images can be acquired. So the present inventor confirmed the range of values of the ratio of the optical length D (D/f), the ratio of the radius of the curvature $r_1$ at the optical axis of the object side face of the first lens $L_1$ ($r_1/f$), the ratio of the focal length $f_1$ of the first lens $L_1$ ($f_1/f$), and the ratio of the focal length $f_3$ of the third lens $L_3$ ($f_3/f$), to the focal length f of the imaging lens, and the Abbe number ν of the second lens $L_2$, which can implement an imaging lens of which optical length is short and back focus is at the maximum, and whereby good images can be acquired, by repeating simulations and prototyping. As a result, the inventor discovered that an imaging lens whereby good images can be acquired can be constructed by satisfying the above mentioned conditions (1) to (5).

The effects of the imaging lens of the present invention implemented by the conditional expressions (1) to (5) are as follows.

Conditional Expression (1) is a conditional expression for specifying the range of a value which the ratio of the optical length D to the focal length f of the imaging lens (D/f) must take.

If the value D/f is greater than the lower limit value given by Conditional Expression (1), that is, if 0.90<D/f, then the respective thickness of the first lens $L_1$, second lens $L_2$ and third lens $L_3$ can be set to be a sufficient thickness that is required for lens processing, or more. In a case of a plastic lens that is formed by the injection molding method, it becomes difficult to inject the plastic material so as to be spread evenly throughout the mold if the thickness thereof is too thin, but this difficulty can be avoided if the thickness is designed to be 0.90<D/f.

If the value D/f is smaller than the upper limit value given by Conditional Expression (1), that is if D/f<1.20, on the other hand, then the respective external size of the first lens $L_1$, second lens $L_2$ and third lens $L_3$ can be maintained in a range where compactness will not be diminished.

In an image generated by an imaging lens, light quantity generally decreases when approaching from the center portion of the image to the peripheral portion. The ratio of the brightness of the peripheral area of an image to the brightness of the center area of the image is called the "peripheral light quantity ratio", and it is important to create the imaging lens so that the peripheral light quantity ratio becomes as high as possible (so that the brightness becomes even throughout the center area to the peripheral area of the image). If the imaging lens is designed such that the peripheral light quantity ratio becomes high, the respective sizes of the first lens $L_1$, second lens $L_2$ and third lens $L_3$ generally increase. However if D/f<1.20, the peripheral light quantity ratio can be sufficiently increased without increasing the respective size of the first lens $L_1$, second lens $L_2$ and third lens $L_3$ until compactness of the imaging lens is diminished. The compactness of the imaging lens here means that the size of the lens with respect to the focal length of the imaging lens is small enough not to cause problems during practical use.

Conditional Expression (2) is a conditional expression for specifying the range of a value of the ratio of the radius of the curvature (radius of curvature on axis) $r_1$ to the focal length f of the imaging lens, that is ($r_1/f$), in the vicinity of the optical axis on the object side face of the first lens $L_1$.

If the value $r_1/f$ is greater than the lower limit value given by Conditional Expression (2), that is 0.20<$r_1/f$, then the back focus of the imaging lens can be secured long enough to insert such an optical component as a cover glass or a filter between the imaging lens and the image sensing surface, while securing the optical length to be sufficiently short. If 0.20<$r_1/f$, then the spherical aberration of the imaging lens can be decreased, and the first lens $L_1$ can be easily processed.

If the value $r_1/f$ is smaller than the upper limit value given by Conditional Expression (2), that is $r_1/f$<0.35, then the back focus of the imaging lens can be easily decreased, and compacting can be easily implemented. Also the spherical aberration and astigmatism aberration do not become too high. In addition to this, the front side principal point position (object side principal point position) of the first lens $L_1$ can be easily disposed at a position close to the object, so the incident angle of rays which enter the image surface can be set to a small value, that is the rays can be entered at an angle close to vertical with respect to the image surface.

If principal rays enter the image sensing surface diagonally, a major shift from the vertical direction, then shading occurs due to the decrease of the light quantity entering the pixels disposed on the image sensing surface, and the image becomes dark in the peripheral area of the image sensing surface. However if the value $r_1/f$ is smaller than the upper limit value given by Conditional Expression (2), then the rays can enter the image surface at an angle close to vertical, so the generation of shading can be prevented.

Conditional Expression (3) is a conditional expression for specifying the refractive power of the first lens $L_1$, in other words, for specifying the range of a value of the ratio ($r_1/f$) of the focal length $f_1$ of the first lens $L_1$ to the focal length f of the imaging lens.

If the value $f_1/f$ is greater than the lower limit value given by Conditional Expression (3), that is 0.80<$f_1/f$, then the positive refractive power of the first lens $L_1$ does not become too strong, and the generation of a high degree spherical aberration and comatic aberration to be generated in the first lens $L_1$ can be decreased.

If the value $f_1/f$ is smaller than the upper limit value given by Conditional Expression (3), that is $f_1/f<1.00$, then the generation of various aberrations can be suppressed to be low, and good images can be easily acquired.

Conditional Expression (4) is a conditional expression for specifying the refractive power of the third lens $L_3$, that is for specifying the range of a value of the ratio of the focal length $f_3$ of the third lens $L_3$ to the focal length $f$ of the imaging lens ($f_3/f$). If the value $f_3/f$ is in a range given by Conditional Expression (4), that is in a range that can satisfy $-9.00<f_3/f<-3.20$, then various aberrations can be sufficiently corrected and a bright imaging lens, of which aperture F value is sufficiently small, can be implemented.

Conditional Expression (5) is a conditional expression for specifying the range of a value of the Abbe number $v$ of the second lens $L_2$.

The first lens $L_1$ is a lens having a positive refractive power, and the image formation function is satisfied by this lens. The major role of the second lens $L_2$ and the third lens $L_3$, on the other hand, is correcting the aberrations generated in the first lens $L_1$. Therefore the composite refractive power, which is determined by the composite focal length of the second lens $L_2$ and the third lens $L_3$, is set to be negative. Therefore in order to increase flexibility in designing the imaging lens, it is preferable that the refractive power of the second lens $L_2$ be set in a wide range, from a weak negative value to a positive value. For this, the Abbe number of the second lens $L_2$ must be set to a large value.

By repeating simulations and prototyping, the present inventor confirmed that the refractive power of the second lens $L_2$ can be set to a wide range, from a weak negative value to a positive value, if the Abbe number $v$ of the second lens $L_2$ is greater than 50.0, that is if $50.0<v$. In other words, it was confirmed that the aberrations generated in the first lens $L_1$ can be sufficiently corrected by the second lens $L_2$ and the third lens $L_3$ if $50.0<v$.

The reason why the Abbe number $v$ of the second lens $L_2$ is specified to be smaller than 60.0, that is $v<60.00$ in Conditional Expression (5), is that plastic lens materials, that can actually be obtained, exist if the Abbe number is in a range smaller than 60.0.

By using a lens configuration that satisfies Conditional Expression (1) to (5), an imaging lens having sufficient brightness, of which optical length is short and back focus is at the maximum, and whereby good images can be acquired, can be implemented.

By forming all of the first lens $L_1$, second lens $L_2$ and third lens $L_3$ constituting the imaging lens of the present invention using plastic material, low cost and light weight can be implemented. Since the Abbe number of cycloolefin plastic is 56.2, the first lens $L_1$, second lens $L_2$ and third lens $L_3$ can be formed using cycloolefin plastic.

By setting the Abbe number of the second lens $L_2$ to a large value, 56.2, the refractive power of the second lens $L_2$ can be set to a positive value or a negative value. Since wide flexibility of designing can be secured, as seen here where the refractive power of the second lens $L_2$ can be set to a value in a wide range, chromatic aberration can be effectively decreased.

If the refractive power of the second lens $L_2$ is set to a negative value, the refractive power of the third lens $L_3$ can be smaller (absolute value of the focal length is greater) than the case of setting the refractive power of the second lens $L_2$ to a positive value, and the Abbe number of the third lens $L_3$ can be small. In other words, the third lens $L_3$ can be formed using polycarbonate, which has a small Abbe number, 30.0, as a material.

EXPLANATION OF REFERENCE SYMBOLS

10 solid-state image sensor
12 cover glass
S aperture stop
$L_1$ first lens
$L_2$ second lens
$L_3$ third lens
$r_i$ radius of curvature at the optical axis on the i-th surface
$d_i$ distance from the i-th surface to the (i+1)th surface

BEST MODE FOR CARRYING OUT THE INVENTION

Embodiments of the present invention will now be described with reference to the drawings. Each drawing roughly shows the shape, size and positional relationship of composing elements in order to assist in understanding the present invention, and the numerical and other conditions to be described below are only preferred examples, and the present invention is not limited in any way to the embodiments of the present invention.

Figure 1:
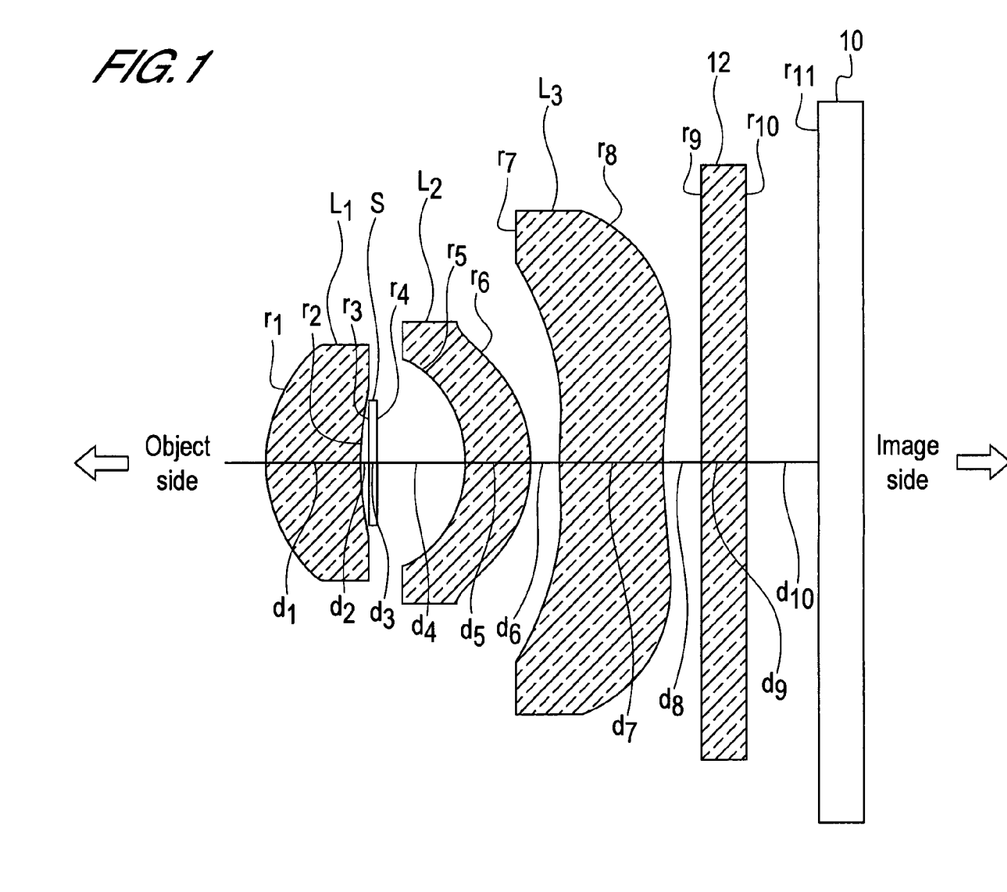
FIG. 1 is a cross-sectional view depicting an imaging lens according to the present invention.

FIG. 1 is a diagram depicting a configuration of an imaging lens according to the present invention. The symbols of the surface number and the surface spacing defined in FIG. 1 are also commonly used in FIG. 2 and FIG. 6.

A first, second and third lens, counted from the object side, are denoted with $L_1$, $L_2$ and $L_3$, such as the first lens $L_1$, second lens $L_2$ and third lens $L_3$. A solid-state image sensor constituting a light receive surface, which is an image formation surface, is denoted with 10, a cover glass partitioning the solid-state image sensor and the lens system is denoted with 12, and an aperture stop is denoted with S. The surfaces constituting the aperture stop S are $r_3$ and $r_4$. In a range where no misunderstanding can be generated, $r_i$ (i=1, 2, 3, ..., 11) is used as a variable, which indicates a value of the radius of curvature in the vicinity of the optical axis (radius of curvature at the optical axis), or as a symbol for identifying the lens, cover glass or image sensing surface (e.g. $r_i$ is used for indicating the object side surface of the first lens).

For the parameters such as $r_i$ (i=1, 2, 3, ..., 11) and $d_i$ (i=1, 2, 3, ..., 10) shown in FIG. 1, specific values are provided in Table 1 and Table 2. The suffix i is assigned corresponding to a surface number of each lens, the thickness of each lens or the surface spacing of the lenses, sequentially from the object side to the image side. In other words $r_i$ is a radius of curvature at the optical axis on the i-th surface, $d_i$ is a distance from the i-th surface to the (i+1)th surface, $N_i$ is a refractive index of the material of the lens having the i-th surface and (i+1)th surface, and $v_i$ is an Abbe number of the material of the lens having the i-th surface and (i+1)th surface.

Figure 2:
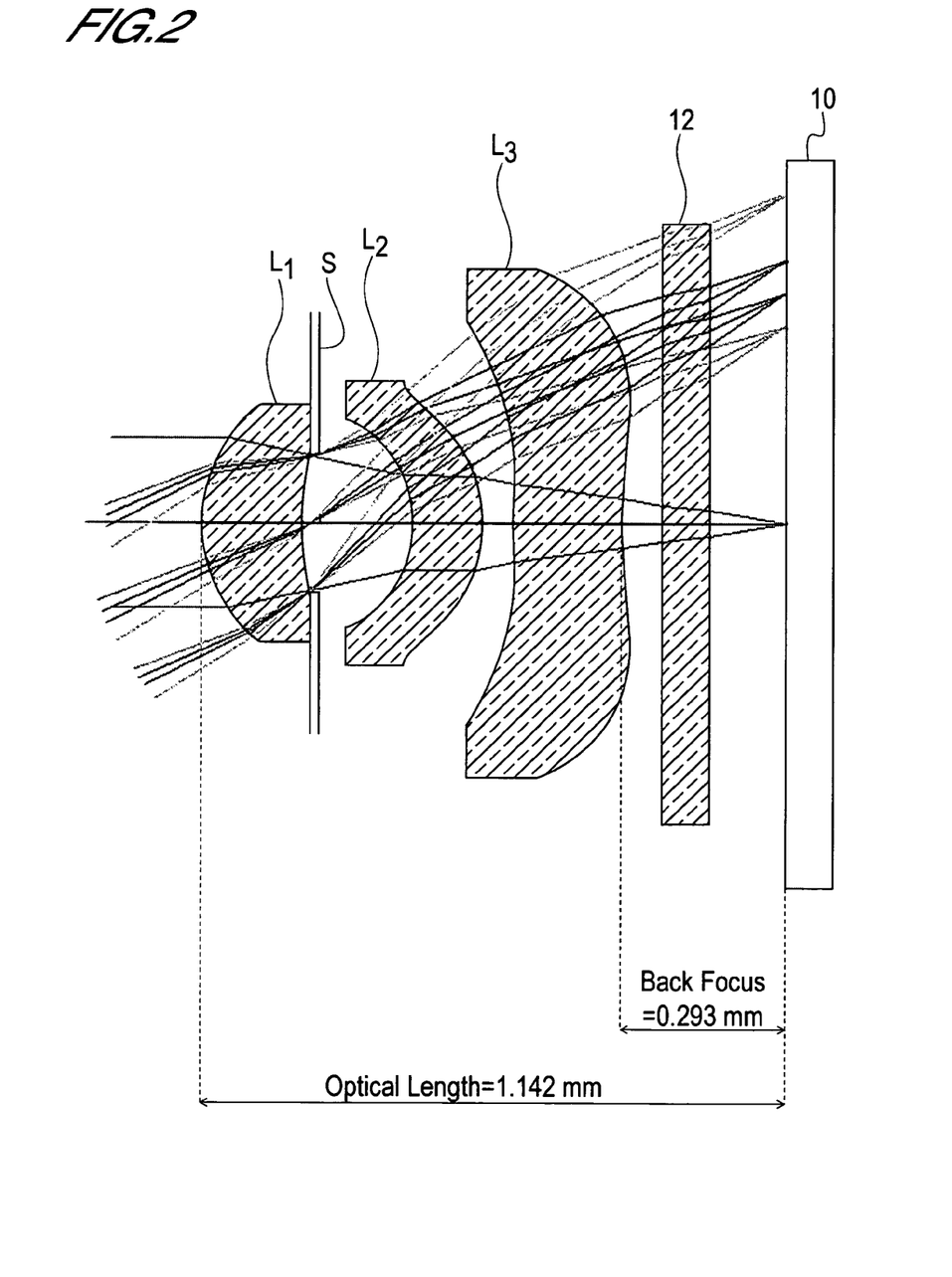
FIG. 2 is a cross-sectional view depicting an imaging lens according to a first embodiment 1.
Figure 6:
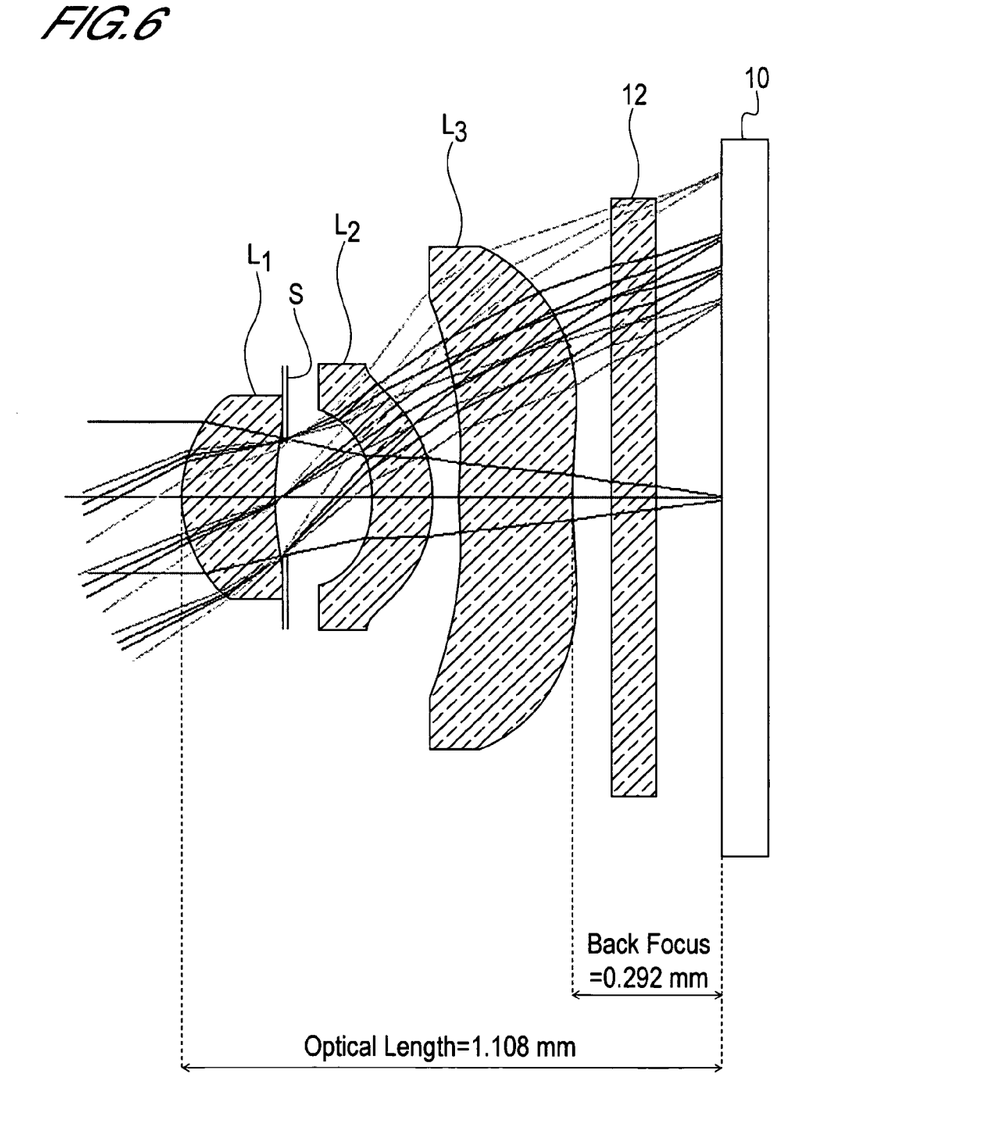
FIG. 6 is a cross-sectional view depicting an imaging lens according to a second embodiment.

In FIG. 1, the aperture of the diaphragm is shown by a rectangle. This is because the intersection of the diaphragm surface and the optical axis must be clearly shown to define the distance from the lens surface to the diaphragm surface. In FIG. 2 and FIG. 6, which are cross-sectional views of the imaging lens of the first embodiment and second embodiment, a main body of the diaphragm for shielding light is shown by two lines of which the start point is the edge of the aperture, by opening the aperture of the diaphragm, which is unlike FIG. 1. This is because the status of the diaphragm must be shown by opening the aperture of the diaphragm in order to enter such rays as principal rays.

The optical length D is a value resulting when $d_1$ to $d_7$ are added, and then the back focus $b_f$ is added. The back focus $b_f$ is a distance from the image side surface to the image sensing side surface of the third lens $L_3$ on the optical axis. It is assumed that the back focus $b_f$ is calculated by removing the cover glass 12, which is inserted between the third lens $L_3$ and the image sensing surface. In other words, in order to make the optical distance (optical path length) from the image side surface to the image sensing surface of the third lens $L_3$ the same when the cover glass is inserted and when the cover glass is not inserted, the geometric distance (geometric length) must be changed. This is because the refractive index of the cover glass is higher than 1, and the optical path length in the space where the cover glass exists becomes longer than the geometric path length. How much longer depends on the refractive index and the thickness of the cover glass to be inserted. Therefore in order to define the back focus $b_f$ as a value unique to the imaging lens which does not depend on the existence of the cover glass, a value measured without the cover glass is used.

The spherical data is shown in Table 1 and Table 2 respectively with surface numbers. The surfaces $r_3$ and $r_4$ of the aperture stop S and both faces $r_9$ and $r_{10}$ of the cover glass are planes, so these are indicated as radius of radius of curvature ∞. The value $r_1$ (I=1, 2, 3, . . . , 11) of the radius of curvature on an optical axis is a positive value if it is convex to the object side, and is a negative value if it is convex to the image side.

The aspherical surface used for this invention is given by the following expression.

$$Z = ch^2/[1+\{1-(1+k)c^2h^2\}^{+1/2}] + A_0h^4 + B_0h^6 + C_0h^8 + D_0h^{10}$$

where

Z: depth from the contact surface to the vertex of the surface c: paraxial curvature of the surface h: height from the optical axis k: cone constant $A_0$: aspherical surface coefficient of degree 4

$B_0$: aspherical surface coefficient of degree 6

$C_0$: aspherical surface coefficient of degree 8

$D_0$: aspherical surface coefficient of degree 10

In Table 1 and Table 2, the numeric value to indicate an aspherical surface coefficient is denoted by an exponent, and "e–1", for example, means "the –1th power of 10". Below Table 1 and Table 2, the open F number (also called the open F value), which is an index of the brightness of the lens, is indicated by Fno, and the focal length f of the imaging lens, focal length $f_1$ of the first lens $L_1$, focal length $f_2$ of the second lens $L_2$, and focal length $f_3$ of the third lens $L_3$, are shown. The focal length f of the imaging lens is normalized to 1.0 mm. The open F number refers to the F number when the diameter of the aperture stop is designed to be the maximum.

Now the imaging lenses according to the first embodiment and second embodiment will be described with reference to FIG. 2 to FIG. 9. FIG. 2 and FIG. 6 are diagrams depicting a general lens configuration of the first and second embodiments.

Figure 3:
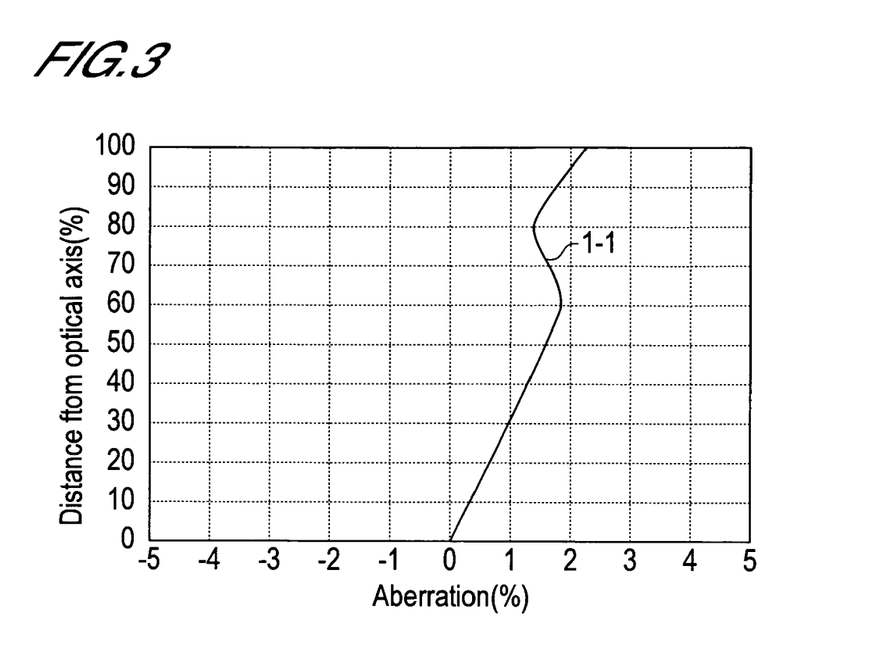
FIG. 3 is a diagram depicting the distortion aberration of the imaging lens of the first embodiment.
Figure 7:
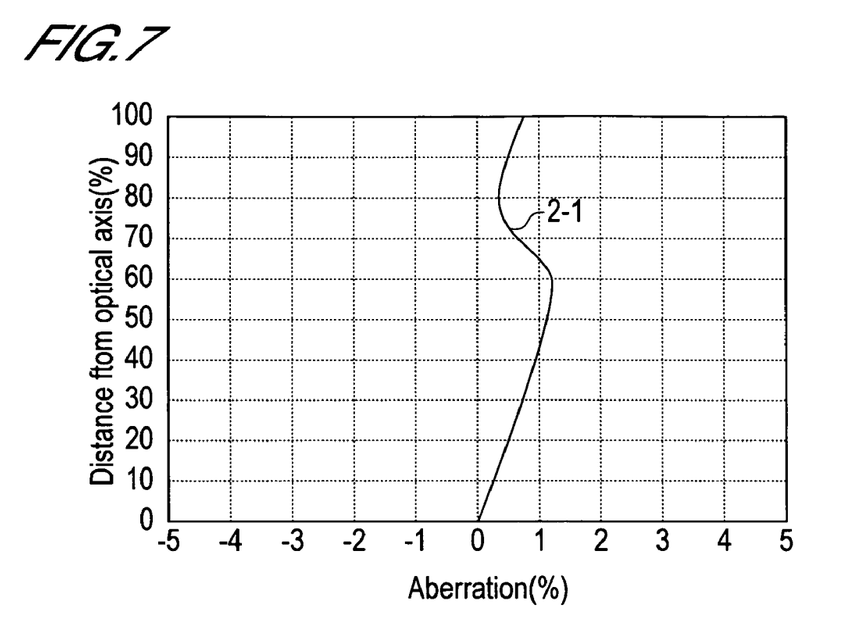
FIG. 7 is a diagram depicting the distortion aberration of the imaging lens of the second embodiment.

The distortion aberration curves shown in FIG. 3 and FIG. 7 show the aberration (unsatisfactory quantity of tangent condition is shown in the abscissa by percentage) with respect to the distance from the optical axis (shown in the ordinate by percentage with the maximum distance from the optical axis within the image surface as 100).

Figure 4:
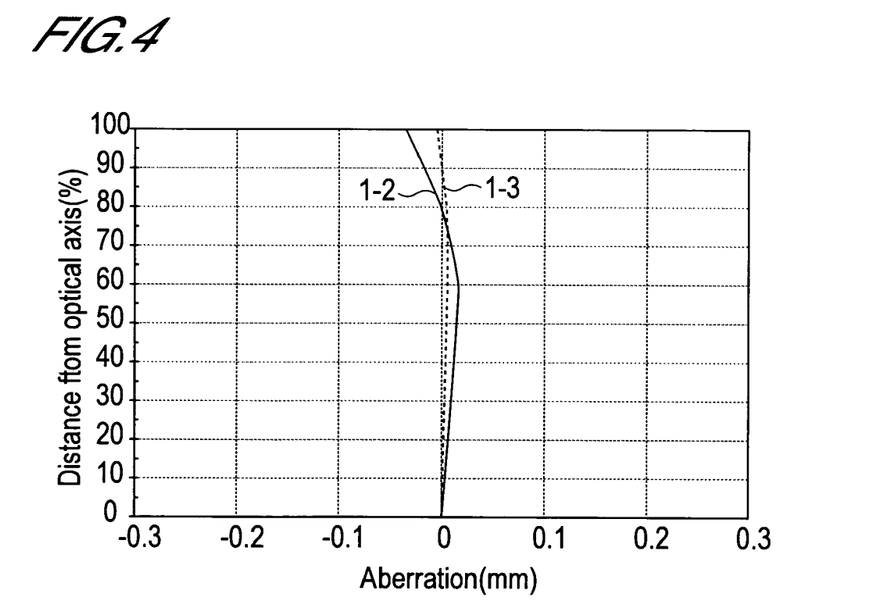
FIG. 4 is a diagram depicting the astigmatism aberration of the imaging lens of the first embodiment.
Figure 8:
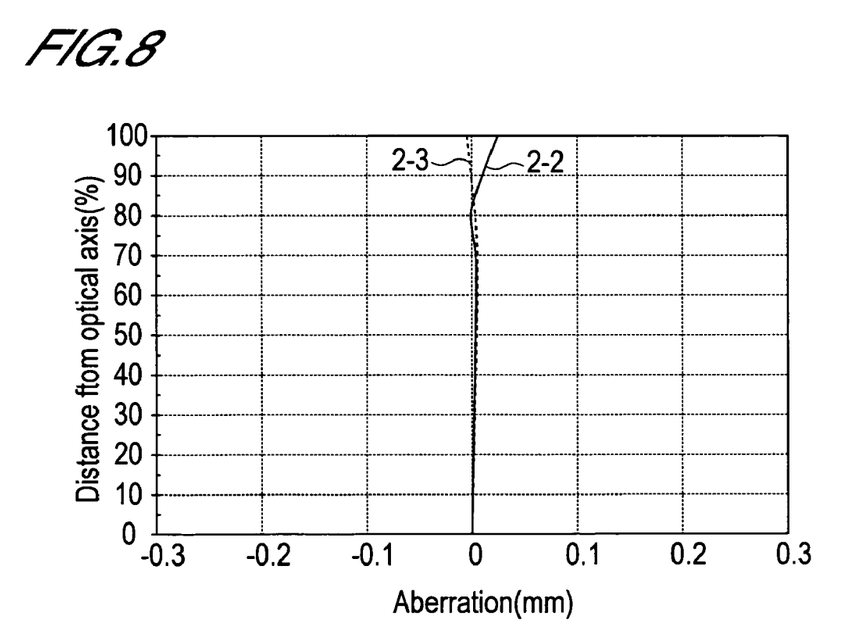
FIG. 8 is a diagram depicting the astigmatism aberration of the imaging lens of the second embodiment.

The astigmatism aberration curves shown in FIG. 4 and FIG. 8 show the aberration (in mm units) in the abscissa with respect to the distance from the optical axis, just like the distortion aberration curves, and show the aberration (in mm units) on the meridional surface and the sagittal surface.

Figure 5:
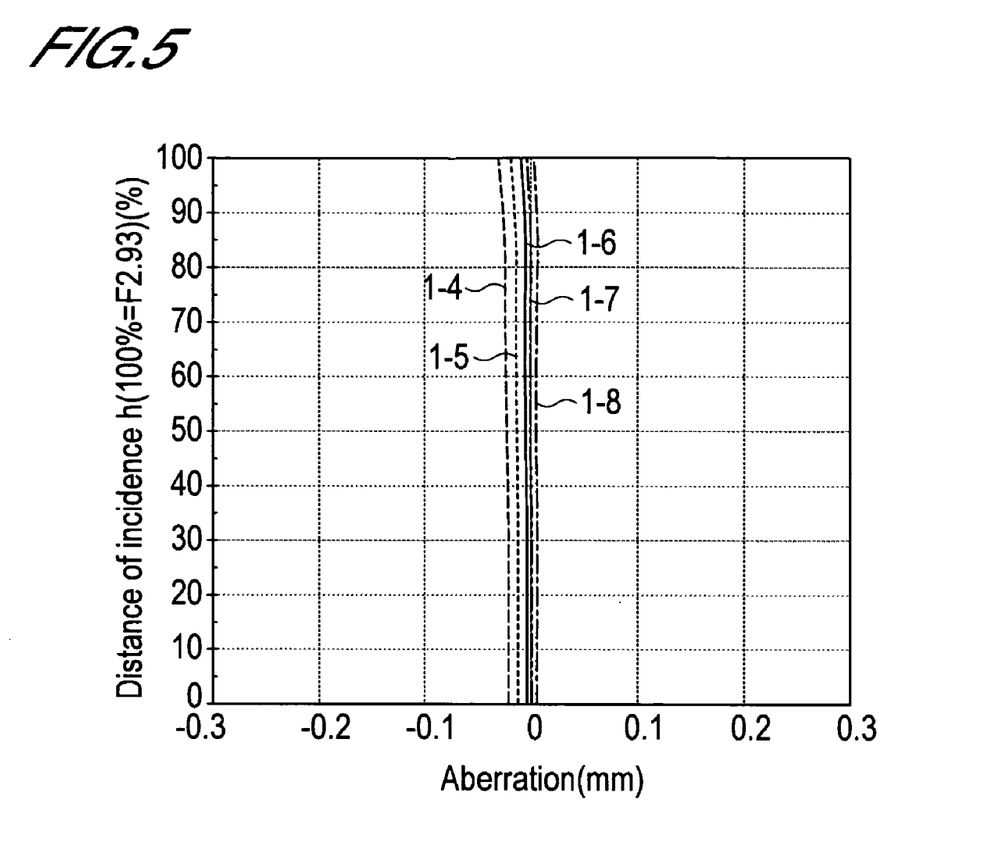
FIG. 5 is a diagram depicting the chromatic/spherical aberration of the imaging lens of the first embodiment.
Figure 9:
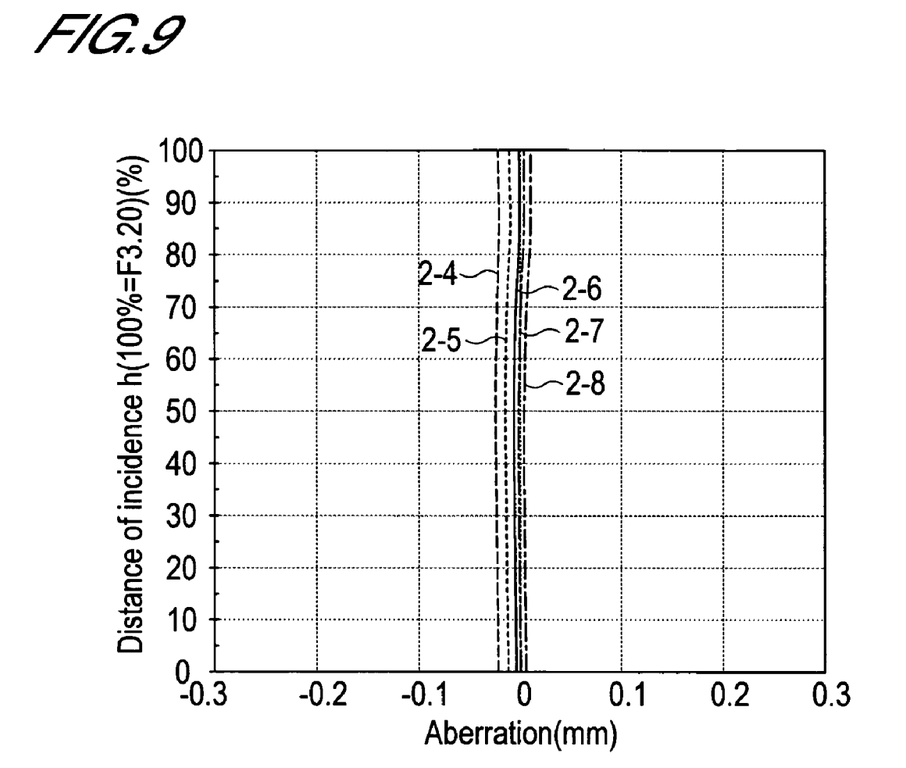
FIG. 9 is a diagram depicting the chromatic/spherical aberration of the imaging lens of the second embodiment.

The chromatic/spherical aberration curves in FIG. 5 and FIG. 9 show the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm). The refractive index shows a refractive index of the d-line (light with a 587.6 nm wavelength). In FIG. 5 and FIG. 9, the aberration (in mm units) is shown in the abscissa, with respect to the entrance height h in the ordinate. The entrance height h in the ordinate is shown as a value converted into an F number. For example, in the case of a lens of the first embodiment of which Fno is 2.93, the entrance height h=100% in the ordinate corresponds to F=2.93, while in the case of a lens of the second embodiment of which Fno is 3.20, the entrance height h=100% in the ordinate corresponds to F=3.20.

TABLE 1

| | | | | First Embodiment | | | | |
|---|---|---|---|---|---|---|---|---|
| Radius of Curvature ($r_i$) | Interval ($d_i$) | Refractive Index ($N_i$) | Abbe Number ($v_i$) | Aspheric Coefficients | | | | |
| | | | | K | $A_4$ | $A_6$ | $A_8$ | $A_{10}$ |
| $r_1$ = 0.316 | $d_1$ = 0.1954 | $N_1$ = 1.53000 | $v_1$ = 56.0 | –9.200e–1 | 2.823 | 1.137e+2 | –2.201e+3 | 2.764e+4 |
| $r_2$ = 0.759 | $d_2$ = 0.0181 | | | 1.580e+1 | –4.509 | 2.468e+2 | –1.143e+4 | 3.646e+4 |
| $r_3$ = ∞ | $d_3$ = 0.0160 | | | | | | | |
| $r_4$ = ∞ | $d_4$ = 0.1806 | | | | | | | |

TABLE 1-continued

First Embodiment

| Radius of Curvature ($r_i$) | Interval ($d_i$) | Refractive Index ($N_i$) | Abbe Number ($v_i$) | Aspheric Coefficients | | | | |
|---|---|---|---|---|---|---|---|---|
| | | | | K | $A_4$ | $A_6$ | $A_8$ | $A_{10}$ |
| $r_5 = -0.311$ | $d_5 = 0.1385$ | $N_5 = 1.53000$ | $v_5 = 56.0$ | 2.650e−1 | 4.473e−1 | −8.698e+2 | 1.630e+4 | −1.813e+5 |
| $r_6 = -0.342$ | $d_6 = 0.0587$ | | | 4.540e−1 | −1.290e+1 | 3.904e+2 | −1.011e+4 | 1.049e+5 |
| $r_7 = 1.075$ | $d_7 = 0.2137$ | $N_7 = 1.53000$ | $v_7 = 56.0$ | −2.760e+2 | −1.010e+1 | 4.272e+1 | −7.903 | −1.665e+2 |
| $r_8 = 0.635$ | $d_8 = 0.0824$ | | | −1.810e+1 | −4.363 | 1.015e+1 | −3.183e+1 | 6.553 |
| $r_9 = \infty$ | $d_9 = 0.0903$ | $N_9 = 1.51680$ | $v_9 = 64.1$ | | | | | |
| $r_{10} = \infty$ | $d_{10} = 0.1504$ | | | | | | | |

Focal Length f = 1.00 mm
F Number $F_{no}$ = 2.93
$f_1$ = 0.89 mm
$f_2$ = 12.26 mm
$f_3$ = −3.28 mm

TABLE 2

Second Embodiment

| Radius of Curvature ($r_i$) | Interval ($d_i$) | Refractive Index ($N_i$) | Abbe Number ($v_i$) | Aspheric Coefficients | | | | |
|---|---|---|---|---|---|---|---|---|
| | | | | K | $A_4$ | $A_6$ | $A_8$ | $A_{10}$ |
| $r_1 = 0.283$ | $d_1 = 0.1871$ | $N_1 = 1.53000$ | $v_1 = 56.0$ | 4.605e−2 | 4.565e−1 | −9.627e−1 | 6.151e+1 | 1.173e+4 |
| $r_2 = 0.629$ | $d_2 = 0.0152$ | | | 2.397 | 1.128 | 1.073e+2 | 9.566e+2 | −6.412e+4 |
| $r_3 = \infty$ | $d_3 = 0.0100$ | | | | | | | |
| $r_4 = \infty$ | $d_4 = 0.1721$ | | | | | | | |
| $r_5 = -0.276$ | $d_5 = 0.1221$ | $N_5 = 1.50900$ | $v_5 = 56.4$ | 1.261 | −1.005e+1 | −1.195e+2 | 1.764e+4 | −4.060e+5 |
| $r_6 = -0.356$ | $d_6 = 0.0526$ | | | 2.325e−1 | −1.747e+1 | 1.804e+2 | −1.575e+2 | 1.204e+4 |
| $r_7 = 1.390$ | $d_7 = 0.2258$ | $N_7 = 1.58300$ | $v_7 = 30.0$ | −1.567e+2 | −1.324e+1 | 1.248e+2 | −5.165e+2 | 8.427e+2 |
| $r_8 = 1.024$ | $d_8 = 0.0797$ | | | 5.036e−1 | −6.999 | 1.815e+1 | −4.310e+1 | 3.489e+1 |
| $r_9 = \infty$ | $d_9 = 0.0913$ | $N_9 = 1.51680$ | $v_9 = 64.1$ | | | | | |
| $r_{10} = \infty$ | $d_{10} = 0.1522$ | | | | | | | |

Focal Length f = 1.00 mm
F Number $F_{no}$ = 3.20
$f_1$ = 0.82 mm
$f_2$ = −4.93 mm
$f_3$ = −8.62 mm The characteristics of the imaging lenses of the first embodiment and second embodiment are shown below. In the first embodiment, the material used for the first lens $L_1$, second lens $L_2$ and third lens $L_3$ is a cycloolefin plastic called "Zeonex E48R" (Zeonex is a registered trademark of Nippon Zeon Co. Ltd., and E48R is the product number). In the second embodiment, the material used for the first lens $L_1$ is Zeonex E48R, the material used for the second lens $L_2$ is a cycloolefin plastic called "Zeonex 330R" (330R is a product number of Nippon Zeon Co. Ltd.), and the material used for the third lens $L_3$ is polycarbonate.

The refractive index of Zeonex E48R with respect to the d-line is 1.53000, and the Abbe number thereof is 56.0, and the refractive index of Zeonex 330R with respect to the d-line is 1.50900, and the Abbe number thereof is 56.4. The refractive index of polycarbonate with respect to the d-line is 1.58300, and the Abbe number thereof is 30.0.

Both surfaces of the first lens $L_1$, second lens $L_2$ and third lens $L_3$ are aspherical respectively. In other words, there are six aspherical surfaces.

The cover glass 12 is inserted between the third lens $L_3$ and the solid-state image sensor 10. The material of the cover glass 12 is an optical glass BK7 (made by Hoya Corp.) of which refractive index with respect to the d-line is 1.51680 and the Abbe number is 64.1. Various aberrations to be described below have been calculated, including the presence of filters under consideration.

First Embodiment (A) The optical length D is D=1.142 mm as shown in FIG. 2.

(B) The radius of curvature $r_1$ in the vicinity of the optical axis on the object side face of the first lens $L_1$ is $r_1$=0.316 mm as shown in Table 1.

(C) The focal length $f_1$ of the first lens $L_1$ is $f_1$=0.89 mm as shown in Table 1.

(D) The focal length $f_3$ of the third lens $L_3$ is $f_3$=−3.28 mm as shown in Table 1.

(E) The Abbe number $v$ of the second lens $L_2$ is $v$ ($=v_5$)=56.0 as shown in Table 1 (the Abbe number $v$ of the second lens $L_2$ is denoted as $v_5$ in Table 1).

Therefore $$D/f=1.142/1.00=1.142 \qquad (1)$$

$$r_1/f=0.316/1.00=0.316 \qquad (2)$$

$$f_1/f=0.89/1.00=0.89 \qquad (3)$$

$$f_3/f=-3.28/1.00=-3.28 \qquad (4)$$

$$v(=v_5)=56.0 \qquad (5)$$

So the lens system in the first embodiment satisfies the following Conditional Expressions (1) to (5).

$$0.90 < D/f < 1.20 \quad (1)$$

$$0.20 < r_1/f < 0.35 \quad (2)$$

$$0.80 < f_1/f < 1.00 \quad (3)$$

$$-9.00 < f_3/f < -3.20 \quad (4)$$

$$50.0 < \nu < 60.0 \quad (5)$$

As FIG. 2 and Table 1 shows, the aperture stop S is disposed at a position behind the second surface (surface at the image side) of the first lens $L_1$. The numerical aperture (F number) is 2.93. And compared with the case of F number 3.60, brightness becomes about 1.5 times since $(3.60/2.93)^2 = 1.5096$. In other words, about a 50% brighter imaging lens is implemented.

FIG. 2 is a cross-sectional view of the imaging lens of the first embodiment. As FIG. 2 shows, the imaging lens of the first embodiment is comprised of a first lens $L_1$, aperture stop S, second lens $L_2$ and third lens $L_3$, arranged in this sequence from the object side to the image side. The first lens $L_1$ is a meniscus lens having a positive refractive power, of which convex surface is facing the object side, the second lens $L_2$ is a meniscus lens having a positive refractive power, of which convex surface is facing the image side, and the third lens $L_3$ is a meniscus lens having a negative refractive power, of which convex surface is facing the object side. In FIG. 2, the third lens $L_3$ has a meniscus form of which convex surface is facing the object side in an area near the optical axis, but gradually changes to a meniscus form of which convex side is facing the image side, as the area becomes more distant from the optical axis. This change is given by the aspherical coefficient shown in Table 1.

Also as FIG. 2 shows, in the imaging lens in the first embodiment, back focus with respect to the focal length 1.00 mm is 0.293 mm, which is sufficient length.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), FIG. 5 shows a graph of a chromatic/spherical aberration curve (aberration curve 1-4 on the g-line, aberration curve 1-5 on the F-line, aberration curve 1-6 on the e-line, aberration curve 1-7 on the d-line, and aberration curve 1-8 on the C-line).

The ordinates of the aberration curves in FIG. 3 and FIG. 4 show the image height by a % of the distance from the optical axis. In FIG. 3 and FIG. 4, 100%, 80%, 70% and 60% correspond to 0.660 mm, 0.528 mm, 0.462 mm and 0.396 mm. The ordinate of the aberration curve in FIG. 5 shows the entrance height h (F number), and the maximum thereof corresponds to F 2.93. The abscissa of FIG. 5 shows the value of the aberration.

For the distortion aberration, the absolute value of the aberration is 2.2621%, which is the maximum, at the position of 100% image height (image height 0.660 mm), and the absolute value of the aberration is within 2.2621% in a range where the image height is 0.660 mm or less.

For the astigmatism aberration, the absolute value of the aberration on the meridional surface is 0.0349 mm, which is the maximum, at the position of 100% image height (image height 0.660 mm), and the absolute value of the aberration is within 0.0349 mm in a range where the image height is 0.660 mm or less.

For the chromatic/spherical aberration, the absolute value of the aberration curve 1-4 on the g-line is 0.0307 mm, which is the maximum, when the entrance height h is 100%, and the absolute value of the aberration is within 0.0307 mm.

Second Embodiment (A) The optical length D is D=1.108 mm as shown in FIG. 6.

(B) The radius of curvature $r_1$ in the vicinity of the optical axis on the object side face of the first lens $L_1$ is $r_1$=0.283 mm as shown in Table 2.

(C) The focal length $f_1$ of the first lens $L_1$ is $f_1$=0.82 mm as shown in Table 2.

(D) The focal length $f_3$ of the third lens $L_3$ is $f_3$=−8.62 mm as shown in Table 2.

(E) The Abbe number $\nu$ of the second lens $L_2$ is $\nu (=\nu_5)$=56.4 as shown in Table 2 (the Abbe number $\nu$ of the second lens $L_2$ is denoted as $\nu_5$).

Therefore $$D/f = 1.108/1.00 = 1.108 \quad (1)$$

$$r_1/f = 0.283/1.00 = 0.283 \quad (2)$$

$$f_1/f = 0.82/1.00 = 0.82 \quad (3)$$

$$f_3/f = -8.62/1.00 = -8.62 \quad (4)$$

$$\nu(=\nu_5) = 56.4 \quad (5)$$

So the lens system in the second embodiment satisfies the following Conditional Expressions (1) to (5).

$$0.90 < D/f < 1.20 \quad (1)$$

$$0.20 < r_1/f < 0.35 \quad (2)$$

$$0.80 < f_1/f < 1.00 \quad (3)$$

$$-9.00 < f_3/f < -3.20 \quad (4)$$

$$50.0 < \nu < 60.0 \quad (5)$$

As FIG. 6 and Table 2 shows, the aperture stop S is disposed at a position behind the second surface (surface at the image side) of the first lens $L_1$. The numerical aperture (F number) is 3.20. Compared with the case of F number 3.60, brightness becomes about 1.3 times since $(3.60/3.20)^2 = 1.2656$. In other words, about a 30% brighter imaging lens is implemented.

FIG. 6 is a cross-sectional view of the imaging lens of the second embodiment. As FIG. 6 shows, the imaging lens of the second embodiment is comprised of a first lens $L_1$, aperture stop S, second lens $L_2$ and third lens $L_3$, arranged in this sequence from the object side to the image side. The first lens $L_1$ is a meniscus lens having a positive refractive power, of which convex surface is facing the object side, the second lens $L_2$ is a meniscus lens having a negative refractive power of which convex surface is facing the image side, and the third lens $L_3$ is a meniscus lens having a negative refractive power, of which convex surface is facing the object side. In FIG. 6, the third lens $L_3$ has a meniscus form of which convex surface is facing the object side in an area near the optical axis, but gradually changes to a meniscus form of which convex side is facing the image side as the area moves away from the optical axis. This change is given by the aspherical coefficient shown in Table 2.

Also as FIG. 6 shows, in the imaging lens in the second embodiment, back focus with respect to the focal length 1.00 mm is 0.292 mm, which is sufficient length.

FIG. 7 shows a graph of the distortion aberration curve 2-1, FIG. 8 shows a graph of the astigmatism aberration curve (aberration curve 2-2 on the meridional surface and aberration curve 2-3 on the sagittal surface), FIG. 9 shows a graph of a chromatic/spherical aberration curve (aberration curve 2-4 on the g-line, aberration curve 2-5 on the F-line, aberration curve 2-6 on the e-line, aberration curve 2-7 on the d-line, and aberration curve 2-8 on the C-line).

The ordinates of the aberration curves in FIG. 7 and FIG. 8 show the image height by a % of the distance from the optical axis. In FIG. 7 and FIG. 8, 100%, 80%, 70% and 60% correspond to 0.669 mm, 0.535 mm, 0.468 mm and 0.401 mm. The ordinate of the aberration curve in FIG. 9 shows the entrance height h (F number) and the maximum thereof corresponds to F 3.20. The abscissa of FIG. 9 shows the value of the aberration.

For the distortion aberration, the absolute value of the aberration is 1.2025%, which is the maximum, at the position of 60% image height (image height 0.401 mm), and the absolute value of the aberration is within 1.2025% in a range where the image height is 0.669 mm or less.

For the astigmatism aberration, the absolute value of the aberration on the meridional surface is 0.0247 mm, which is the maximum, at the position of 100% image height (image height 0.669 mm), and the absolute value of the aberration is within 0.0247 mm in a range where the image height is 0.669 mm or less.

For the chromatic/spherical aberration, the absolute value of the aberration curve 2-4 on the g-line is 0.0243 mm, which is the maximum, when the entrance height h is 50%, and the absolute value of the aberration is within 0.0243 mm.

In the imaging lens of the second embodiment, all the aberrations of the distortion aberration, astigmatism aberration and chromatic/spherical aberration are kept smaller than the imaging lens of the first embodiment. This is because the Abbe number of the second lens $L_2$ is large, therefore the refractive power of the second lens $L_2$ can be set to a negative value, and the absolute value of the refractive power (negative refractive power) of the third lens $L_3$ can be smaller than the case of setting to a positive value.

In other words, because of the large Abbe number of the second lens $L_2$, the refractive power of the second lens $L_2$ can be changed in a wide range, and it becomes more flexible to distribute the role to correct various aberrations generated in the first lens $L_1$ into the second lens $L_2$ and the third lens $L_3$. Therefore the aberration can be more effectively corrected.

It became clear through prototyping that both imaging lenses of the first embodiment and second embodiment have the performance required for a lens mounted on a compact imaging which uses a CCD or CMOS as an image sensor.

As described above, the problems to be solved by this invention can be solved by setting so that each composing lens of the imaging lens satisfies the Conditional Expression (1) to (5). In other words, an imaging lens of which various aberrations are corrected well, the optical length with respect to the focal length of the imaging lens is short, and the back focus is sufficiently secured, can be acquired.

In the above embodiments, Zeonex E48R or polycarbonate, which are plastic materials, are used for the first lens $L_1$, second lens $L_2$ and third lens $L_3$, but other plastic materials, or material other than plastic material that can satisfy various conditions described in the embodiments, such as mold glass, can be used.

In a portable telephone, for example, a cover glass 12, which plays a role of an infrared cutoff filter, is inserted between the third lens $L_3$ and the image sensing surface $r_{11}$, and with the currently available technology, the cover glass 12 can be inserted if a 0.95 mm or more space is secured between the third lens $L_3$ and the image sensing surface $r_{11}$. In order to mount the imaging lens on a currently available portable telephone, the optical length is preferably 5 mm or less.

According to the imaging lens disclosed in the first embodiment, the optical length D is D=1.142 mm when the focal length of the imaging lens is normalized to 1.00 mm, so if the optical length is 5 mm, this means that the focal length of the imaging lens is 4.3783 mm. The back focus $b_f$ is $b_f$=0.293 mm when the focal length of the imaging lens is normalized to 1.00 mm, so if the focal length of the imaging lens is 4.3783 mm, then the back focus $b_f$ is 1.2828 mm, which means that 0.95 mm or more can be secured for spacing between the third lens $L_3$ and the image capturing surface $r_{11}$.

Also according to the imaging lens disclosed in the second embodiment of the present invention, the optical length D is D=1.108 mm when the focal length of the imaging lens is normalized to 1.00 mm, so if the optical length is 5 mm, this means that the focal length of the imaging lens is 4.5126 mm. The back focus $b_f$ is $b_f$=0.292 mm when the focal length of the imaging lens is normalized to 1.00 mm, so if the focal length of the imaging lens is 4.5126 mm, then the back focus $b_f$ is 1.3177 mm, which means that 0.95 mm or more can be secured for spacing between the third lens $L_3$ and the image capturing surface $r_{11}$.

In the first embodiment, the Abbe number $v_5$ of the second lens $L_2$ is 56.0, and in the second embodiment, the Abbe number $v_5$ of the second lens $L_2$ is 56.4, but if the Abbe number is set to a value greater than 50.0, an imaging lens of which optical length is short and back focus is at the maximum, and whereby good images can be acquired, can be implemented.

INDUSTRIAL APPLICABILITY

As described above, according to the imaging lens of the present invention, various aberrations are corrected well, good images can be acquired even if optical length is short, and back focus can be sufficiently secured. Therefore the imaging lens of the present invention is suitable for a camera lens built into a portable telephone, portable computer, portable TV telephone, PDA (Personal Digital Assistant), an image input device for a personal computer, digital camera, monitoring camera and inspection device, and for a camera lens built into a toy having an image recognition function, camera lens mounted on an automobile, and a camera lens built into a monitoring, inspection or crime prevention equipment.

The invention claimed is:

1. An imaging lens, comprising a first lens $L_1$, an aperture stop S, a second lens $L_2$, and a third lens $L_3$, wherein
said first lens $L_1$, said aperture stop S, said second lens $L_2$ and said third lens $L_3$ are arranged in this sequence from an object side to an image side,
said first lens $L_1$ comprises a meniscus lens having a positive refractive power, of which convex surface faces the object side, said second lens $L_2$ comprises a meniscus lens having a positive or negative refractive power, of which convex surface faces the image side, said third lens $L_3$ comprises a meniscus lens having a negative refractive power, of which convex surface faces the object side, both surfaces of said first lens $L_1$ are aspherical, both surfaces of said second lens $L_2$ are aspherical, and both surfaces of said third lens $L_3$ are aspherical, and the following conditions are satisfied:

$$0.90 < D/f < 1.20 \quad (1)$$

$$0.20 < r_1/f < 0.35 \quad (2)$$

$$0.80 < f_1/f < 1.00 \quad (3)$$

$$-9.00 < f_3/f < 3.20 \quad (4)$$

$$50.0 < v < 60.0 \quad (5)$$

where, f: composite focal length of the imaging lens generated by said first lens $L_1$, said second lens $L_2$ and said third lens $L_3$;

D: distance from the object side surface of said first lens $L_1$ to an image formation surface;

$r_1$: radius of curvature of the object side surface of said first lens $L_1$ in the vicinity of an optical axis of the first lens;

$f_1$: focal length of said first lens $L_1$;

$f_3$: focal length of said third lens $L_3$;

v: Abbe number of said second lens $L_2$.

2. The imaging lens according to claim 1, wherein said first lens $L_1$, said second lens $L_2$ and said third lens $L_3$ are lenses of which material is cycloolefin plastic.

3. The imaging lens according to claim 1, wherein said first lens $L_1$ and said second lens $L_2$ are lenses of which material is cycloolefin plastic, and said third lens $L_3$ is a lens of which material is polycarbonate.

* * * * *